US007186944B2

(12) United States Patent
Matus et al.

(10) Patent No.: US 7,186,944 B2
(45) Date of Patent: Mar. 6, 2007

(54) METHOD AND APPARATUS FOR AUTODETECTION OF PLASMA TORCH CONSUMABLES

(75) Inventors: Tim A. Matus, San Antonio, TX (US); James F. Ulrich, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 361 days.

(21) Appl. No.: 10/605,259

(22) Filed: Sep. 18, 2003

(65) Prior Publication Data

US 2005/0061784 A1    Mar. 24, 2005

(51) Int. Cl.
    B23K 10/00    (2006.01)
(52) U.S. Cl. ............................ 219/121.45; 219/121.39; 219/121.54; 219/121.57; 219/130.4; 219/130.71
(58) Field of Classification Search ............ 219/121.54, 219/121.57, 121.48, 121.59, 121.39, 121.45, 219/130.5, 137.71, 137.21, 130.4; 901/42
    See application file for complete search history.

(56) References Cited

U.S. PATENT DOCUMENTS

| | | | |
|---|---|---|---|
| 4,151,451 A | 4/1979 | Maertins et al. | |
| 5,192,845 A | 3/1993 | Kirmsse et al. | |
| 5,357,076 A * | 10/1994 | Blankenship | 219/121.54 |
| 5,405,075 A | 4/1995 | Narita et al. | |
| 5,512,726 A * | 4/1996 | Arantes et al. | 219/125.1 |
| 6,274,840 B1 | 8/2001 | Kanjo | |
| 6,563,085 B2 * | 5/2003 | Lanouette et al. | 219/130.5 |
| 6,707,304 B2 * | 3/2004 | Buhler et al. | 324/525 |
| 2003/0094487 A1 | 5/2003 | Blankenship et al. | |

FOREIGN PATENT DOCUMENTS

| | | |
|---|---|---|
| EP | 0 878 263 A1 | 11/1998 |
| EP | 1 117 279 A1 | 7/2001 |
| EP | 1117279 A1 * | 7/2001 |
| JP | 61063368 | 4/1986 |

\* cited by examiner

*Primary Examiner*—Mark Paschall
(74) *Attorney, Agent, or Firm*—Ziolkowski Patent Solutions Group, SC

(57) ABSTRACT

A method and apparatus for automatically determining a consumable type when a consumable is disposed within an electrode holder of a welding-type system is disclosed. The invention includes a detector assembly that measures a physical characteristic of a connected consumable and provides feedback regarding that which is measured. From the feedback, the operating parameters of a welding-type process may be automatically prescribed.

20 Claims, 3 Drawing Sheets

METHOD AND APPARATUS FOR AUTODETECTION OF PLASMA TORCH CONSUMABLES

BACKGROUND OF INVENTION

The present invention relates generally to plasma cutting systems and other high power output welding-type systems such as welding and induction heating systems and, more particularly, to a method and apparatus for automatically determining a consumable type when a consumable is disposed within an electrode holder of a welding-type system.

Plasma cutting is a process in which an electric arc is used to cut a workpiece. Plasma cutters typically include a power source, an air supply, and a torch. The torch or plasma torch is used to create and maintain the arc and plasma that perform the cutting. The plasma cutting power source receives an input voltage from a transmission power line or generator and provides an output voltage to a pair of output terminals, one of which is connected to an electrode and the other of which is connected to the workpiece.

The air supply is used with most plasma cutters to help start the arc, provide the plasma gas to the torch, and cool the torch. A movable or fixed electrode or consumable serves as a cathode and a fixed nozzle serves an anode. The air supply moves the electrode and as the electrode moves away from the nozzle, it opens the nozzle, and a plasma jet is created. The plasma jet causes the arc to transfer to the work piece, and thus initiates the cutting process. In other plasma cutting systems, a high frequency starter is used to initiate the cutting process.

Plasma cutting systems are typically used to effectuate the cutting and/or gouging of a workpiece. In this regard, the consumable that is used during the plasma cutting process must be one that is tailored for the specific process being implemented. That is, plasma cutting components are generally classified as either cutting or gouging components. Additionally, plasma cutting components, either cutting or gouging, are typically rated or designed for a specific amperage. Therefore, before carrying out the plasma cutting process, a user must ensure that the proper consumable type has been selected as well as ensuring that the selected consumable has an amperage rating appropriate for the particulars of the plasma cutting process to be carried out. If the plasma cutting process particulars and the consumable are not properly matched, damage to the plasma cutting torch or its components and/or a poor-cut quality may result.

To achieve better accuracy in matching the consumable with the selected or to-be-carried-out plasma cutting process, torches have been designed to have an output range where as consumable components have specific output amperage levels. The consumable set, or components of the consumable set, are designed to operate best at specific parameters of amperage and air pressure. However, if a consumable set is not used under the specific parameters, it may be damaged or cutting performance may be reduced. Often the operator may place the wrong components in the torch and damage them or have bad cutting performance. In this regard, a user or customer must carefully watch to see that the right components are used and that the power source output is set correctly. The difficulty in managing this process negatively affects purchasing costs, storage requirements, and maintenance costs.

It would therefore be desirable to design a method and apparatus that automatically detects the type of consumable connected to the plasma cutting torch and automatically adjust the operating parameters of the plasma cutting system to match the consumable connected to the torch.

BRIEF DESCRIPTION OF INVENTION

The present invention is directed to a method and apparatus for autodetection of consumables overcoming the aforementioned drawbacks.

A detector circuit that is integrated with a plasma cutting torch is provided that automatically determines the type of consumable that is connected to the plasma cutting torch. The detector is also designed to provide feedback to a controller in the power source for the plasma cutting system such that the controller may automatically adjust or define the operating parameters of the power source to match that of the connected consumable. As a result, the plasma cutting process is carried out in a manner that is consistent with the type of electrode, tip, swirl ring, shield, and retaining cup that is connected to the plasma cutting torch. The detector circuit may be constructed to measure a resistance across a pin of the consumable, measure light reflectivity along a surface of the consumable, measure an induction of the consumable when it is connected to the torch, acoustically measure sound reflectivity, measure the attenuation of a high frequency signal directed toward the consumable, or measure any other physical characteristic of the electrode to determine its type.

Therefore, in accordance with one aspect of the present invention, a method of defining a welding-type process is provided. The method includes the steps of detecting consumable presence in an electrode holder and receiving feedback of sensed characteristics of the consumable. The method further includes the step of automatically setting an operating parameter of a welding-type process based on at least consumable type.

In accordance with another aspect of the present invention, a welding-type system is provided that includes a power source and a consumable electrode holder. The system further includes a controller configured to automatically determine a type of consumable disposed in the consumable electrode holder.

According to another aspect of the present invention, a plasma cutter is provided that includes a power source configured to condition raw power into a form usable by a plasma cutting process, and a pressurized gas source. A torch is connected to the power source and the pressurized gas source and is configured to effectuate the plasma cutting process. The plasma cutter further includes means for detecting a type of consumable disposed within the torch.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to the automatic detection and defining of a plasma cutting process based on the type of consumable or electrode connected to a plasma cutting torch. As will be described below, the present invention is directed to a detector that detects and delineates between various consumable types and, based on the type of consumable that is detected, provides feedback to a controller in a plasma cutting power source that automatically sets or defines the operating parameters of the power source to be tailored to the type of consumable connected to the plasma cutting torch. However, one skilled in the art will readily appreciate that the present invention may be equivalently applicable to other high power output systems such as welding systems and induction heating systems.

Figure 1:
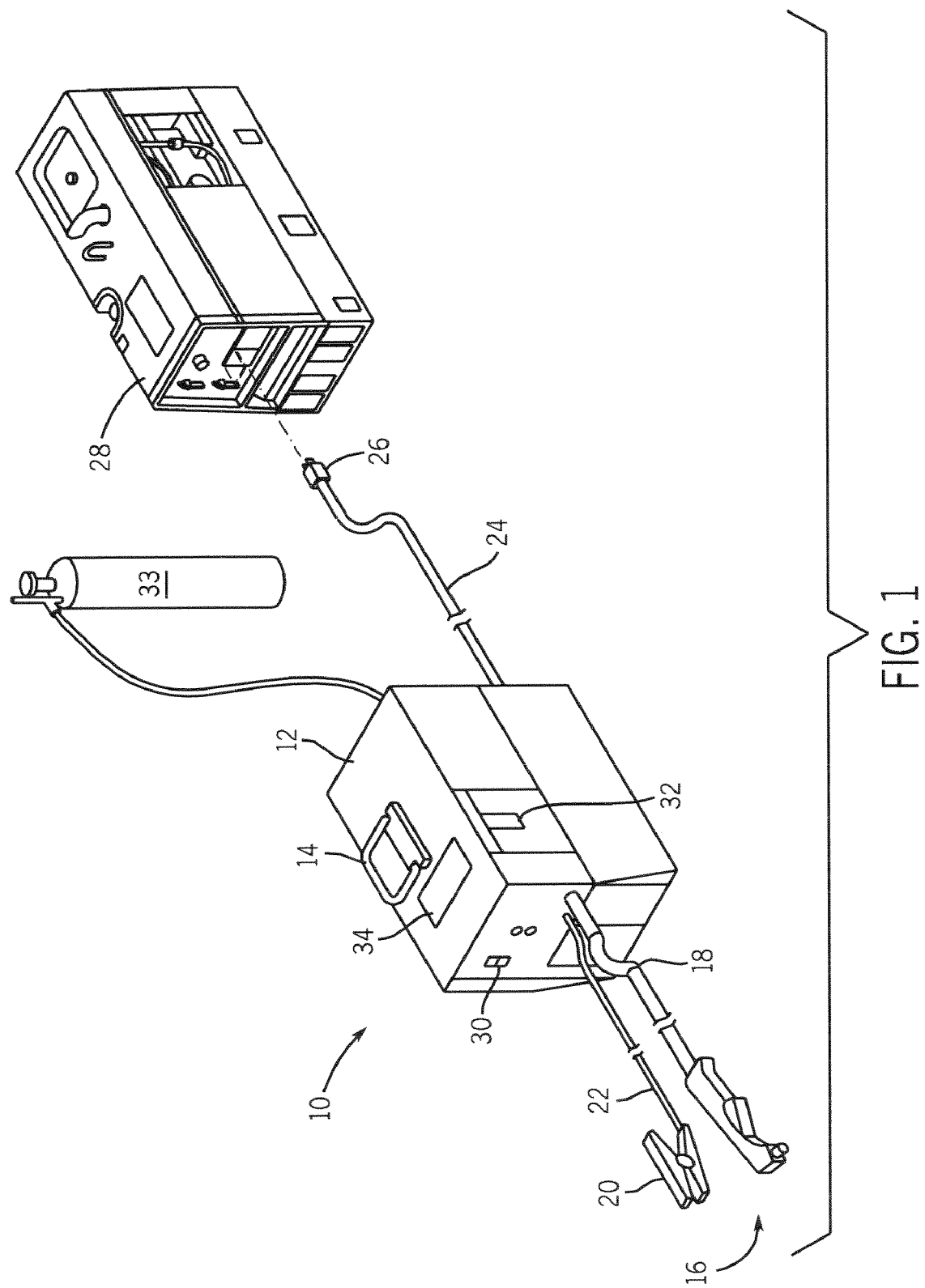
FIG. 1 is a perspective view of a plasma cutting system incorporating the present invention.

Referring to FIG. 1, a plasma cutting system 10 is shown. The plasma cutting system is a high voltage system with maximum open circuit output voltages ranging from approximately 230 Volts Direct Current (VDC) to over 300 VDC. The plasma cutting system 10 includes a power source 12 to condition raw power and regulate/control the cutting process. Specifically, the power source includes a processor that, as will be described, receives operational feedback and controls the plasma cutting system 10 accordingly. Power source 12 includes a lifting means, such as a handle 14 which effectuates transportation from one site to another. Connected to the power source 12 is a torch 16 via cable 18. The cable 18 provides the torch 16 with power and serves as a communications link between the torch 16 and power source 12. The cable 18 contains two conductive paths.

Also connected to power source 12 is a work clamp 20 which is designed to hold a workpiece (not shown) to be cut. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to a portable power supply 28 or a transmission power receptacle (not shown). Power source 12 further includes an ON/OFF switch 30.

To effectuate cutting of a workpiece, torch 16 is placed in close proximity to a workpiece connected to clamp 20. A user may then activate a trigger (not shown) on the power source to deliver power to the torch 16 to initiate a pilot arc. Shortly thereafter, a cutting arc is generated and the user may then slowly move the torch across the workpiece to cut the workpiece. The user may adjust the torch speed to reduce spark splatter and provide a more-penetrating cut. Gas is supplied to torch 16 from a pressurized gas source 33.

Figure 2:
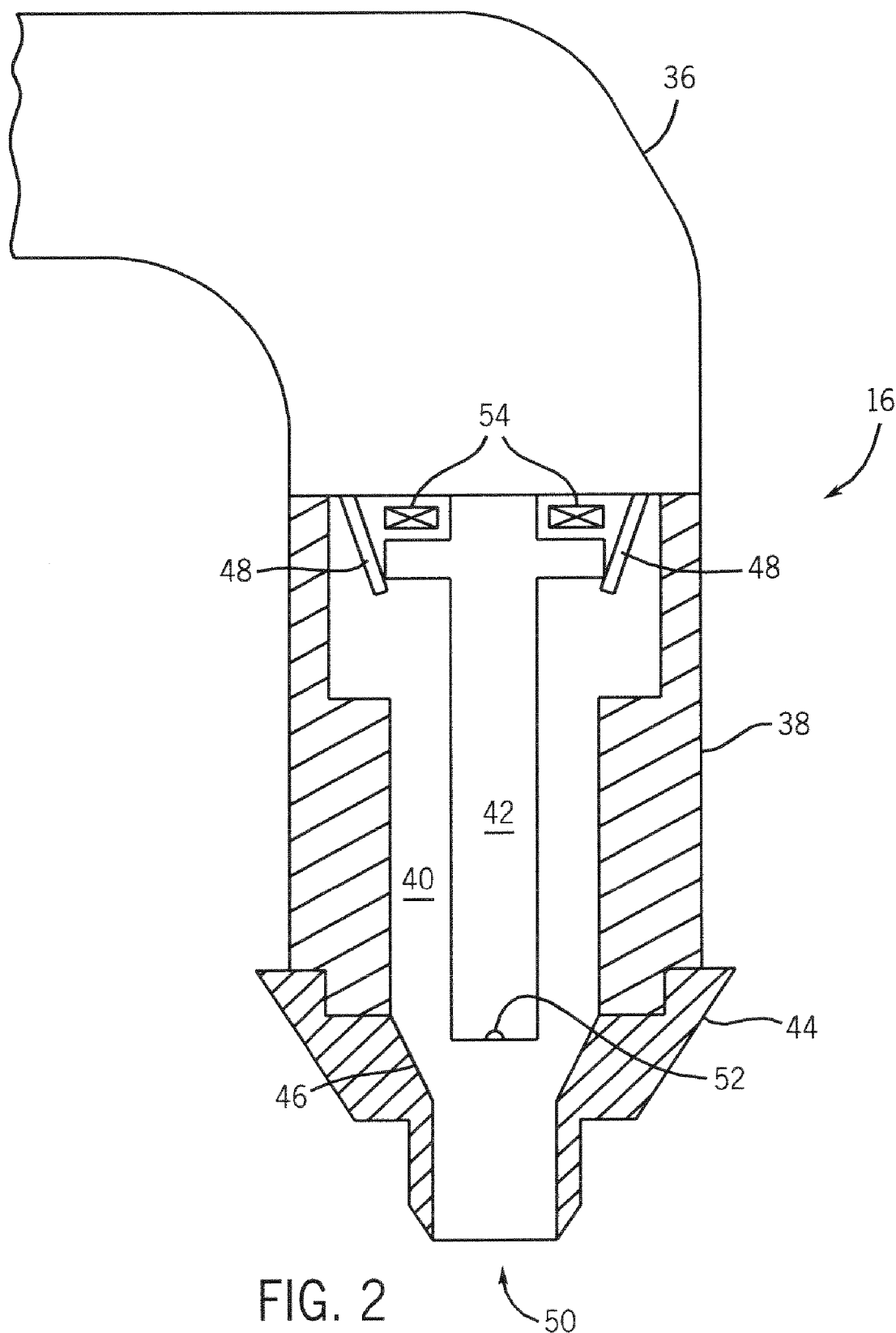
FIG. 2 is a cross-sectional view of a plasma cutting torch in accordance with the present invention.

Referring now to FIG. 2, a cross-section of a plasma cutting torch 16 is shown. Plasma torch 16 is defined by a torch body 36 that is designed to receive a shield cup 38. Shield cup 38 is connected to torch body 36 so as to define a gas chamber 40 that, as will be described in greater detail below, allows for the charging of the gas to a plasma and passage of the plasma. Centrally disposed within gas chamber 40 and connected to torch body 36 is consumable or electrode 42. Consumable 42 is removably connected to torch body 36 and is specifically designed for a particular plasma cutting process. That is, torch 16 is constructed such that various consumables may be interchangeably connected depending upon the particulars of a plasma cutting process to be carried out.

Connected to shield cup 38 is tip 44 that is constructed to form a nozzle 46. In operation, gas is injected into chamber 40 via passages 48 and is heated to a plasma. The plasma is then forced out of the chamber through nozzle 46 and out of the tip 44 via opening or aperture 50. Nozzle 46 is designed to focus the velocity as well as the heat of an arc that is created between a workpiece (not shown) and consumable 42. Consumable 42 is constructed such that the arc extends across an arc path 52 out of the consumable through opening 50.

Torch 16 also includes a detector assembly 54 that is designed to automatically determine the type of consumable that is connected to the torch body. The detector 54 is designed to measure a physical characteristic of the consumable and provide feedback to a controller in the power source that processes the feedback and sets the operating parameters of the power source based on the type of consumable detected. Detector 54 may be designed to measure one of several physical characteristics of the consumable. For example, detector 54 may include a coil in which the consumable is placed when connected to the torch body. In this regard, the coil may be constructed to sense when the consumable is locked in position and, based on the sensory information gathered, provide feedback to the power source controller indicative of the type of consumable placed into position. That is, the coil operates as an antenna and provides feedback regarding the magnetic properties of the consumable based on the induction created when the consumable is placed within the coil.

One skilled in the art will appreciate that a detector that measures the inductance created when the consumable is placed relative to the coil illustrates only one example of the form in which the detector may take. That is, the detector may include a light emitting transmitter as well as a sensor that detects and measures surface reflectivity of the consumable. In this embodiment, the detector provides feedback as to the light reflectivity of the consumable as indicative of the type of consumable connected to the torch. In a further embodiment, acoustical characteristics of the consumable may be measured and used as an indicator of the type of consumable. In yet a further embodiment, the consumable may be constructed to include a pin that is received by the torch when the consumable is locked into position. In this regard, the resistance of the pin may be measured and used to determine the type of consumable attached to the torch. That is, each consumable may be designed to have a unique identifier that takes the form of a particular resistance across the pin. The detector may also be constructed to measure the density of the consumable as an indicator of consumable type. One skilled in the art will appreciate that detectors designed to measure other physical characteristics of the consumable than those specifically enumerated are possible, contemplated, and within the scope of this invention. Additionally, one or more physical characteristics may be measured and, as such, it is contemplated that more than one detector may be used to delineate between consumable types.

Figure 3:
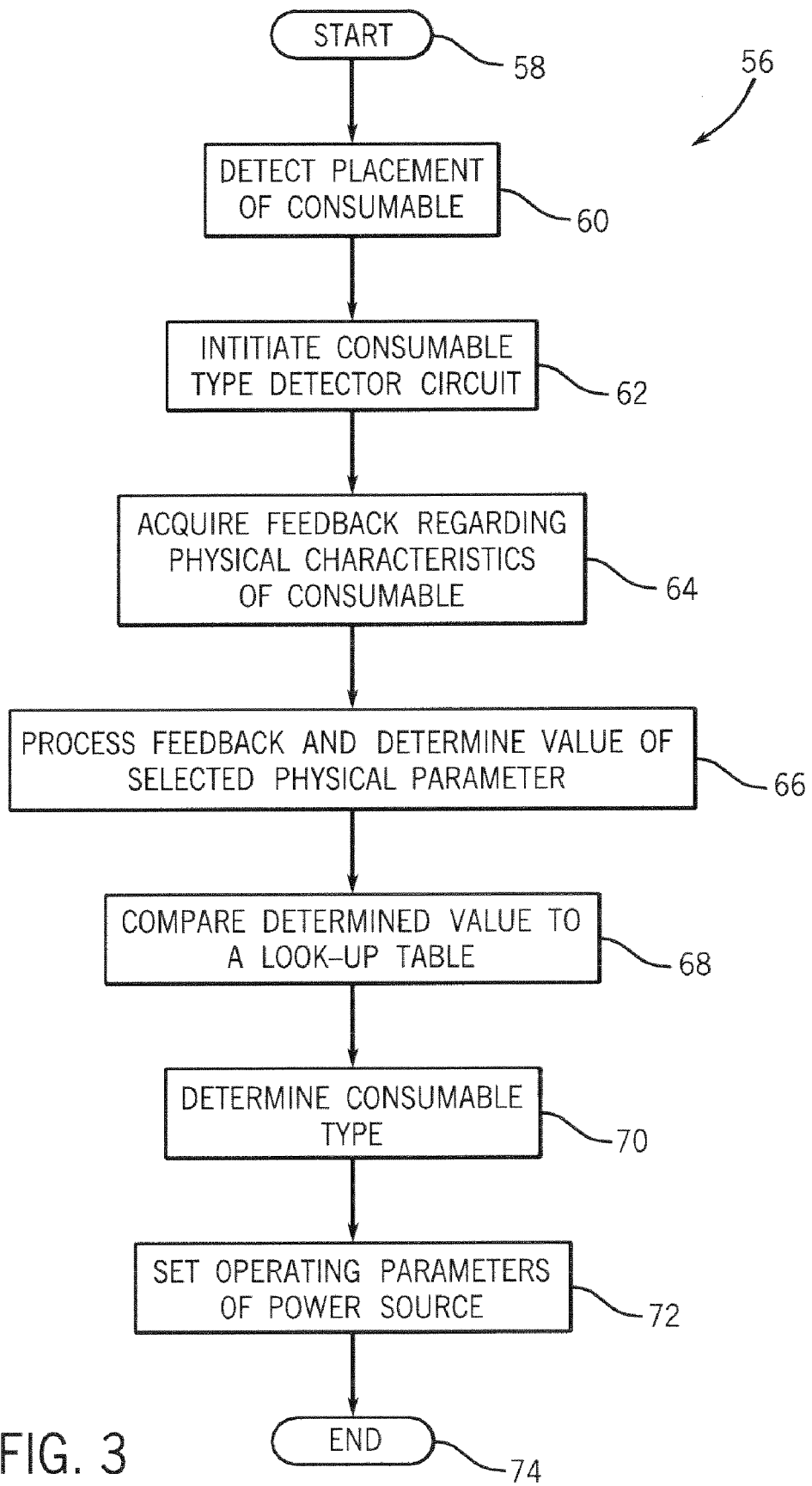
FIG. 3 is a flow chart setting forth the steps of an algorithm to detect the type of consumable connected to a plasma cutting torch and define the operating parameters of a plasma cutting process therefrom in accordance with the present invention.

Referring now to FIG. 3, the steps of an algorithm for setting the output parameters based on at least a type of consumable connected to a plasma cutting torch are set forth. The process 56 may be carried out as a method, or as acts achieved by a controller in accordance with a computer program, or other software or hardware implementation. Process 56 begins at step 58 with the user powering up of the power source. Once the power source for the plasma cutting system is powered, placement of a consumable in the plasma cutting torch is detected at 60. Once a determination is made that a consumable has been connected to the torch, a consumable type detector circuit is activated at 62. As described with respect to FIG. 2, the detector circuit is configured to acquire and provide feedback regarding physical characteristics of the connected consumable. In this regard, process 56 continues with the acquisition of feedback regarding the physical characteristics of the consumable at 64. The feedback is then processed at 66 to determine a value of the selected physical parameter. That is, if an inductance created by the consumable is measured, then a value of that inductance is acquired from the feedback. If a light reflectivity characteristic is measured of the consumable, then a value of the reflectivity is acquired from the feedback.

Regardless of the physical parameter measured, a comparison is made at 68 to a look-up table of empirical values. That is, the determined value of the selected physical parameter is compared to a look-up table of values that are stored in memory of a microprocessor in the power source. Preferably, the look-up table is stored in volatile memory such that as additional consumables are designed and constructed, the look-up table may be properly updated. Based on the comparison of the value for the selected physical parameter of the consumable with the look-up table of known associated values, a determination of the type of consumable connected to the plasma torch is determined at 70. Based on the type of consumable determined, the operating parameters of the power source are set at 72. The appropriate operating parameters, such as output amperage or gas pressure, are preferably stored in a look-up table in volatile memory as well. As such, a real-time determination of the appropriate operating parameters specific to the consumable connected to the plasma torch may be determined and implemented. Accordingly, once the appropriate operating parameters that are specifically tailored to the detected type of consumable are determined, the plasma cutting process is activated upon user initiation or commencement at 74 whereupon process 56 terminates.

In another embodiment, the process may determine that the consumable determined is not compatible with the plasma system or inconsistent with other pre-selected operating parameters input by the user. If such a determination is made, an audio or visual indicator may be provided to the user indicating that the connected consumable is unsupported and that the consumable should be replaced or previously selected user inputs be revised. Additionally, the controller may be designed to prevent initiation of the plasma cutting process if an incompatible consumable is determined connected to the torch.

In a further embodiment, an indication, such as a text message or audio message, may be provided indicating the consumable that was determined to be connected to the torch. As such, the user may receive confirmation that the desired electrode was, in fact, connected to the torch. Further, if the user is aware of the type of consumable connected, the indication may be reviewed by the user to confirm that an appropriate determination of consumable type was made.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

Therefore, in accordance with one embodiment of the present invention, a method of defining a welding-type process is provided. The method includes the steps of detecting consumable presence in an electrode holder and receiving feedback of sensed characteristics of the consumable. The method further includes the step of automatically setting an operating parameter of a welding-type process based on at least consumable type.

In accordance with another embodiment of the present invention, a welding-type system is provided that includes a power source and a consumable electrode holder. The system further includes a controller configured to automatically determine a type of consumable disposed in the consumable electrode holder.

According to another embodiment of the present invention, a plasma cutter is provided that includes a power source configured to condition raw power into a form usable by a plasma cutting process, and a pressurized gas source. A torch is connected to the power source and the pressurized gas source and is configured to effectuate the plasma cutting process. The plasma cutter further includes means for detecting a type of consumable disposed within the torch.

The present invention has been described in terms of the preferred embodiment, and it is recognized that equivalents, alternatives, and modifications, aside from those expressly stated, are possible and within the scope of the appending claims.

What is claimed is:

1. A plasma cutter comprising:
   a power source configured to condition raw power into a form usable by a plasma cutting process;
   a pressurized gas source;
   a torch connected to the power source and the pressurized gas source, and configured to effectuate the plasma cutting process;
   means for detecting a type and compatibility of consumable disposed within the torch; and
   means for setting an operating parameter of the plasma cutting process, based on the type of consumable detected in addition to preventing initiation of the plasma cutting process based on an incompatible consumable.

2. The plasma cutter of claim 1 further comprising means for automatically controlling the power source based on at least the type of consumable.

3. The plasma cutter of claim 2 wherein the type of consumable includes a one-piece consumable.

4. A plasma cutting system comprising:
   a power source;
   a torch connected to the power source and having a plasma torch consumable component connected thereto; and
   a controller configured to automatically determine a type of plasma torch consumable connected to the torch and configured to (1) adjust an operating parameter of the power source and (2) allow initiation prevention of the plasma cutting process, based on the type of plasma torch consumable component.

5. The system of claim 4 wherein the power source includes a menu window and the controller is further configured to display the type of plasma torch consumable component on the menu window.

6. The system of claim 4 wherein the controller is configured to adjust one of cutting voltage and cutting current based on the type of plasma torch consumable component.

7. The system of claim 6 wherein the operating parameter includes at least an amperage of an output current of the power source.

8. The system of claim 6 further comprising a detector circuit configured to transmit feedback to the controller indicative of physical characteristics of the plasma torch consumable component connected to the torch.

9. The system of claim 8 wherein the detector circuit includes a sensor designed to measure a light reflectivity of an outer surface of the plasma torch consumable component.

10. The system of claim 8 wherein the detector circuit includes a sensor designed to measure a resistance of a pin of the plasma torch consumable component connecting the plasma torch consumable component to the torch.

11. The system of claim 8 wherein the detector circuit includes an induction circuit designed to output a current proportional to a magnetic field generated by the plasma torch consumable component.

12. The system of claim 8 wherein the detector circuit includes a sensor designed to measure sound reflectivity of the plasma torch consumable component.

13. A method of defining a plasma cutting process, the method comprising:
   detecting presence of a component in a plasma torch;
   receiving feedback of sensed characteristics of the component;
   allowing initiation prevention of the plasma cutting process based on the component detected; and
   automatically adjusting an operating parameter of a plasma cutting process to control cutting based on the sensed characteristic of the component.

14. The method of claim 13 further comprising measuring a resistance between the component and the plasma torch, comparing a value of the resistance to a look-up table, and determining a type of the component therefrom.

15. The method of claim 13 further comprising measuring a surface light reflectivity of the component, comparing a value of surface light reflectivity to a look-up table, and determining component type therefrom.

16. The method of claim 13 further comprising measuring a magnetic field induced current in a detector coil, comparing a value of the current to a look-up table, and determining consumable type therefrom.

17. The method of claim 13 further comprising measuring surface sound reflectivity of the consumable, comparing a value of surface sound reflectivity to a look-up table, and determining consumable type therefrom.

18. The method of claim 13 wherein the component includes a cutting or a gouging component.

19. The method of claim 13 wherein the operating parameter includes at least one of power source output current and gas pressure.

20. The method of claim 13 further comprising displaying an indicator of component type on a power source display.

* * * * *